United States Patent
Koch et al.

(10) Patent No.: US 11,016,056 B2
(45) Date of Patent: May 25, 2021

(54) DEVICE, SENSOR UNIT AND TRANSMITTER FOR DETERMINING A MEASURED VARIABLE

(71) Applicant: KROHNE Messtechnik GmbH, Duisburg (DE)

(72) Inventors: Christian Koch, Witten (DE); Andreas Schwaner, Alpen (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 815 days.

(21) Appl. No.: 15/504,780

(22) PCT Filed: Aug. 18, 2015

(86) PCT No.: PCT/EP2015/068946
§ 371 (c)(1),
(2) Date: Feb. 17, 2017

(87) PCT Pub. No.: WO2016/026857
PCT Pub. Date: Feb. 25, 2016

(65) Prior Publication Data
US 2017/0269028 A1 Sep. 21, 2017

(30) Foreign Application Priority Data
Aug. 19, 2014 (DE) ...................... 10 2014 111 805.7

(51) Int. Cl.
*G01N 27/416* (2006.01)
*G01N 27/49* (2006.01)

(52) U.S. Cl.
CPC ..... *G01N 27/4167* (2013.01); *G01N 27/4165* (2013.01); *G01N 27/49* (2013.01)

(58) Field of Classification Search
CPC . G01N 27/4167; G01N 27/49; G01N 27/4165
See application file for complete search history.

(56) References Cited

U.S. PATENT DOCUMENTS

| | | |
|---|---|---|
| 2004/0010739 A1 | 1/2004 | Odom et al. |
| 2008/0061792 A1 | 3/2008 | Hsiung et al. |
| 2014/0266760 A1* | 9/2014 | Burke, Jr. ........... G06F 19/3462 340/687 |

FOREIGN PATENT DOCUMENTS

WO 2007/012508 A1 2/2007

OTHER PUBLICATIONS

DAQ NI 60523 User Manual, Multifunction I/O Devices for PCI/PXI/1394, Bus Computers NI 60523 User Manual, National Instruments, Oct. 2002.

(Continued)

*Primary Examiner* — Shogo Sasaki
(74) *Attorney, Agent, or Firm* — David S. Safran; Roberts Calderon Safran & Cole, P.C.

(57) ABSTRACT

A device (1) for determining a measured variable, that allows an as simple as possible adaptation to the measurement conditions, is achieved in that the device (1) has a sensor unit (2) and a transmitter (3). The sensor unit (2) generates an electric primary signal in dependence on the measured variable, and communicates the primary signal via an analog output interface (4) to the transmitter (3) which processes the primary signal. Furthermore, the sensor unit (2) and transmitter (3) are advantageous by themselves, and the sensor unit (2) preferably allows for offline calibration under constant surrounding conditions.

14 Claims, 1 Drawing Sheet

(56) References Cited

OTHER PUBLICATIONS

Advanced RFID Measurmenets: Theory to Protocol Conformance Test, Tutorials, Internet: http://www.ni.com/tutorial/6645/en/ Dec. 19, 2013, p. 1-14.

* cited by examiner

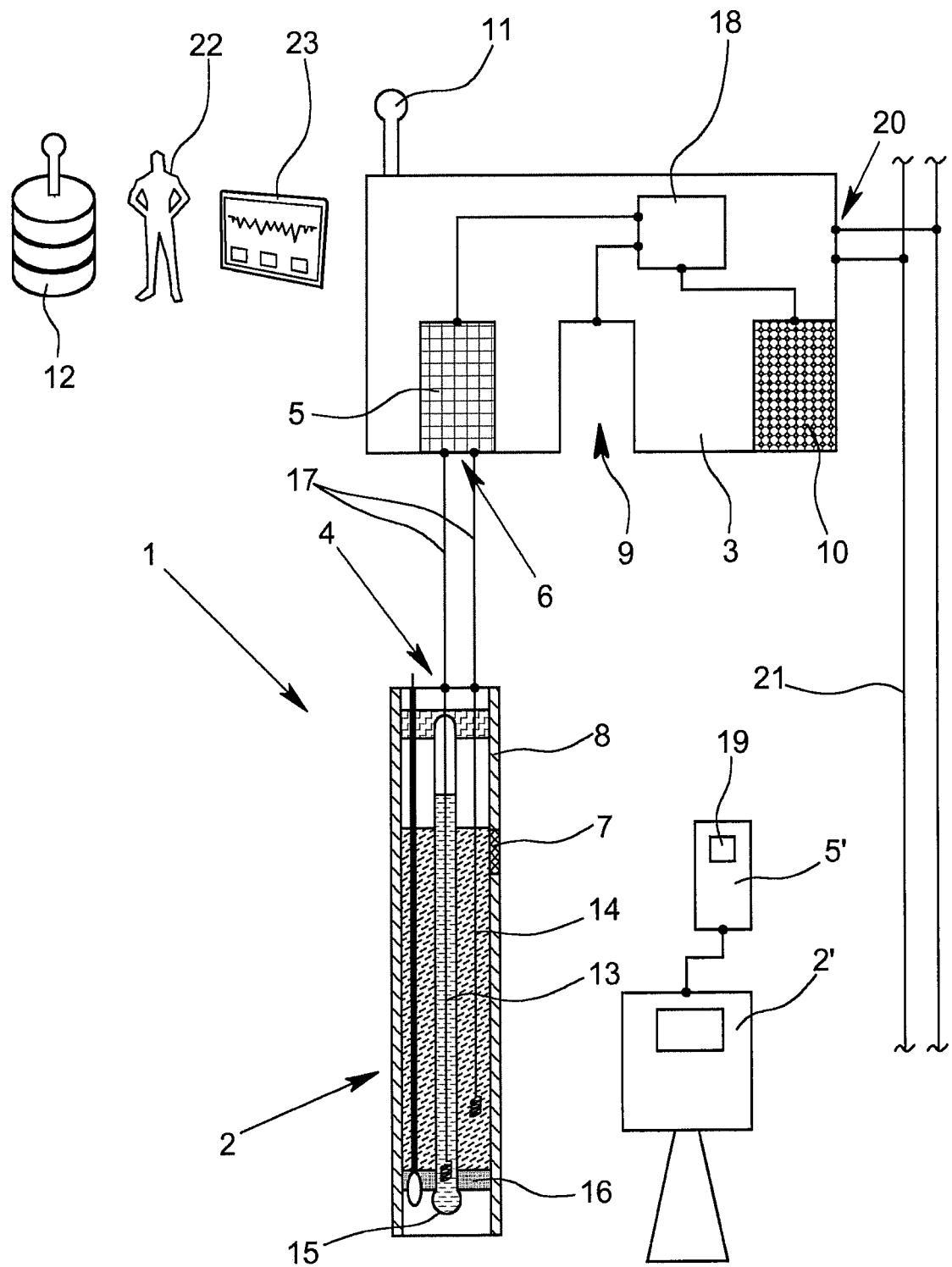

DEVICE, SENSOR UNIT AND TRANSMITTER FOR DETERMINING A MEASURED VARIABLE

BACKGROUND OF THE INVENTION

Field of the Invention

The invention relates to a device for determining at least one measured variable. Furthermore, the invention relates to a sensor unit for determining at least one measured variable. Finally, the invention relates to a transmitter for processing primary signals of at least one sensor unit. Thereby, the measured variable can be, for example, the pH value, the portion of oxygen or chlorine in solution, the fill level, the temperature, the flow, the mass flow, the level of turbidity, the redox potential or the electric conductivity of a medium. The medium is, thereby, for example, a liquid, a bulk material, a gas or a mixture.

Description of Related Art

It is common in modern process automation to determine measured or process variables, in that a measuring device generates a—normally electric—primary signal that is dependent on the measured variable. In potentiometric measurement of the pH value, for example, the electromotive force between two electrodes is measured, of which one is found in a buffer solution and the other in the sample to be measured. The electric voltage resulting in the primary signal allows for the determination of the pH value. In flow measurement using the vortex principle, for example, the primary signal includes the frequency of the vortex generated by the bluff body, from which the flow is determined.

Thereby, the primary signal is converted by some measuring devices into the value of the measured variable and output. Alternatively, the primary signals are completely processed by a so-called measuring transducer—also called a transmitter—or at least treated and transmitted in a standard format to a higher-ranking unit, e.g., a control room, in order to be processed there.

Depending on the processes or states in a process to be monitored, it can be necessary to determine different measured variables. Furthermore, an exchange of the measuring arrangement can also be necessary for cleaning or calibrating purposes. If, for example, one measuring device is replaced by another during calibration, then the downtime of the monitored process is reduced. Additionally, in the sense of economics or, also, ecology there is a desire to simplify and unify as many devices as possible in order to end up using the so-called modular design principle.

SUMMARY OF THE INVENTION

Thus, the object of the invention is to provide a device for determining a measured variable—as well as a sensor unit and a transmitter—, which allows an as simple as possible adaptation to the measurement conditions.

The device according to the invention for determining at least one measured variable, in which the above derived and described object is achieved, is initially and essentially characterized in that at least one sensor unit and at least one transmitter are provided. Thereby, the sensor unit generates at least one electric primary signal in dependence on the measured variable. The sensor unit communicates the primary signal via an analog output interface to the transmitter. Finally, the transmitter processes the primary signal.

The invention is based on the measurement device being comprised of at last one transmitter and one sensor unit. Thus, the electronics necessary for the determination of the measured variable are preferably arranged in the transmitter. The sensor unit, itself, can be designed relatively simply and economically.

Thereby, the sensor unit generates, in particular, only one analog primary signal, which is output via an analog output interface. In the simplest case, this is at least one electric contact.

The primary signal is received by the transmitter and is processed there.

In one design, the value of the measured variable is directly determined by the transmitter. In an alternative design, the primary signal is, e.g., strengthened and/or converted into a standard signal, e.g., a 4 . . . 20 mA signal.

In one design, it is provided that the sensor unit and the transmitter are detachably connectable to one another. This allows for an exchange of the sensor unit.

In a further design, the idea of the separation into individual functional units or modules is broadened, in that it is provided that at least one electronic insert is assigned to the sensor unit. Thereby, the electronic unit has at least one analog input interface, via which, for example, the reception of the analog primary signal of the sensor unit can take place. The electronic insert processes at least the primary signal in view of the measured variable. Finally, the electronic insert and the transmitter are detachably connectable to one another.

In this design, an electronic insert is provided that is used for the processing of the primary signal. This electronic insert is, thereby, preferably specially designed for the sensor unit or the type of sensor unit or the measured variable. Furthermore, the electronic insert can be flexibly connected to the transmitter. Thus, the possibility of evaluating the primary signal for the transmitter results using the electronic insert. However, the electronic inserts are also capable of processing further signals. If, for example, the sensor unit is a pH probe, then the respective electronic insert can evaluate not only the electric voltage dependent on the pH value as primary signal, but also, preferably, a temperature signal of a temperature probe.

An exchange of the type of sensor unit or the determination of a further measured variable can, thus, be easily implemented in that the electronic insert is exchanged or a further is connected to the transmitter.

The signals of the electronic insert are, in one design, directly output via an input/output interface of the transmitter. In an alternative design, the signal of the electronic insert is processed by the transmitter or is converted into a selectable output format (e.g., 4 . . . 20 mA, Hart, FieldbusFoundation, etc.).

The transmitter allows, in one design, a plurality of sensor units to be connected via their electronic inserts. In a further design, the transmitter has several interfaces for output of signals or data. The plurality of sensor units and the plurality of interfaces then allow a plurality of configurations for outputting the respective measurement data.

In this design, the sensor unit generates an analog primary signal that is processed by the associated electronic insert. The electronic insert, in turn, is connected to the transmitter and communicates the processed primary signal to the transmitter. In one design, the electronic insert is inserted in the transmitter and thus also forms an—exchangeable—part of the transmitter.

The sensor unit and the associated electronic insert are, thereby in one design, detachably connected to one another.

Overall, the device—as measuring device—is designed using modules, which allows for the exchange of the sensor unit, a switch of the measuring principle and a reduction of costs and materials.

According to a further teaching of the invention, the object is achieved using a sensor unit for determining at least one measured variable. Thereby, the sensor unit has an analog output interface. The sensor unit generates at least one electric primary signal in dependence on the measured variable and outputs the primary signal as an analog electric signal via the analog output interface.

In one design, the output interface is also used as an input interface. If the sensor unit, for example, allows for the measurement of conductivity, then the sensor unit receives an electric signal, e.g., in the form of a sine signal via the above-mentioned interface. This measurement signal is given by the electronic insert to the sensor unit.

The primary signal of the sensor unit, in one design, is generated by the sensor unit together with other measurement components. In this manner, for example, an electric voltage between the sensor unit and a reference unit is generated as primary signal.

For a series of measurement principles, it is necessary that the used sensor units are calibrated. Furthermore, the primary signal is optionally dependent on specific parameters of the sensor unit. This sensor-specific data is, thus, necessary for the evaluation of the primary signal and should be known in the transmitter or, respectively, in the associated electronic insert.

It is provided in one design that the sensor unit can be calibrated offline under definable surrounding conditions. The sensor unit thus, for example, can be calibrated in a laboratory and, thus, offline, i.e., outside of the process. This makes it possible, in particular, for the calibration to be able to take place under definable and preferably constant surrounding conditions. This increases the life and leads to a reduction of costs. The sensor unit—optionally, in conjunction with the electronic insert—can, thus, be calibrated at a location that is different than the operation site of the sensor unit.

In one design, the required data can be input by a user. In a further design, the transmitter or the electronic insert comprise the relevant data. In a further design, the transmitter or the electronic insert has access to a relevant database.

In an alternative or additional design, the sensor unit has at least one data carrier. Thereby, data associated with the sensor unit can be stored on the data carrier. The data carrier, itself, is arranged on or in the housing of the sensor unit.

In one design, the data carrier is an optical element such as a bar code or a QR code, which at least includes data in respect to the type of sensor unit or identification of the special sensor unit.

In an alternative design, the data carrier is a RFID tag (from radio frequency identification) or a NFC tag (from near field communication), in which, for example, calibration data of the sensor unit is stored.

In one design, the data carrier contains at least one piece of information that is used for identifying the sensor unit.

The following designs deal with the basic construction of the sensor unit.

It is thereby provided in one design that the sensor unit has only the analog output interface.

In a further design, the sensor unit is free of—in particular, electronic—elements that generate a digital signal from the primary signal. Alternatively or additionally, the sensor unit is free of elements that determine a value of the measured variable from the primary signal.

In both above-mentioned designs, the sensor unit is, thus, capable neither of determining the value of the measured variable from the primary signal nor of digitizing the primary signal for further communication.

In a further design, analog electronic elements are provided in the sensor unit that strengthen the primary signal or cause a change between current or voltage signal, i.e. the analog electronic elements generate a purely analog electric signal.

In a further design, the sensor unit is free of electronic components. The sensor unit thus comprises, essentially, only those components that generate the electric primary signal based on the measured variable. A further processing or treating in the sensor unit, itself, is not possible.

In the case of determining the pH value, the sensor unit, thus, has only electrodes for measuring the electric potential generated by the medium.

Further primary measuring elements are also provided in further designs. If, for example, a temperature-dependent resistor element is provided, then the element is used for the actual measurement of temperature and, in this sense, is not to be understood as an electronic component.

According to an additional teaching, the invention relates to a transmitter for processing primary signals that originate from at least one sensor unit. The transmitter thereby has at least one electronics receptacle, in which the electronic insert can be inserted. The electronic insert is thereby assigned to the sensor unit and is used for processing the primary signals of the sensor unit. Thereby, the electronics receptacle allows for the electronic insert to be detachably inserted.

The at least one electronic receptacle allows for the transmitter to be adapted for the respective sensor unit by means of the detachable insertion of the electronic insert and thus, to suitably posses the components that are required for processing the primary signals of the sensor unit.

In one design, the transmitter has at least one data reader for reading data from a data carrier of the sensor unit. Depending on the design of the data carrier, the data reader is to be accordingly designed. If the data carrier is a type of labeling of the sensor unit—such as a bar code or a QR code—then, a corresponding scanner is to be provided or a corresponding processing is necessary in the transmitter. If the data carrier is, alternatively, a RFID tag or a NFC tag, then the data reader allows the reading of data stored there.

In an alternative or additional design, the writing of data on the data carrier of the sensor unit is also possible with the data reader. In one design, calibration data can be written on the data carrier, e.g., in the form of a logbook. Other data can also be introduced on the data carrier by the transmitter.

In a further design, it is provided that the transmitter has at least one radio interface. This radio interface, in one variation, allows for the connection to a data base or to a higher-ranking unit such as a control room. In a further variation, communication via the radio interface is possible using an electronic unit (e.g., a tablet or a hand-held or any mobile communication device) of a user.

In a further design, the transmitter controls a relay.

In a further design, the transmitter has additional interfaces, e.g., a USB interface.

In a further design, the transmitter has at least one input/output interface, alternatively several such interfaces are provided. Thereby, these are fieldbus interfaces, e.g., in the form of a 4 . . . 20 mA/HART, RS485, Fieldbus Foundation or other interface for input or output of data or signals.

Additionally or alternatively, a display and/or control unit is provided as part of the transmitter.

The device described above can be formed of the described sensor unit or, respectively, the described transmitter. Thus, the explanations in respect to the device hold true for the sensor and the transmitter and vice versa.

In detail, there is a plurality of possibilities for designing and further developing the device according to the invention, the sensor unit according to the invention and the transmitter according to the invention as will be apparent from the following description of an embodiment in conjunction with the drawings.

BRIEF DESCRIPTION OF THE DRAWING

The sole FIGURE is a purely schematically depicted measurement arrangement.

DETAILED DESCRIPTION OF THE INVENTION

A part of a device 1 for determining a measured variable is shown in FIG. 1. A sensor unit 2 carries out the actual measurement and generates a primary signal. The primary signal, which has a known dependence on the measured variable, is communicated to a transmitter 3 and processed by the transmitter. The processing relates, for example, to a treatment, e.g., a conversion into a 4 . . . 20 mA signal or to a determination of the measured value of the measured variable.

Thereby, the transmitter 3 is variably designed so that it can convert a plurality of different measured signals into many different output signals. This is, thereby—as shown—possible in the process, but also in a laboratory, i.e. under definable surrounding conditions.

The sensor unit 2 has, overall, two analog output interfaces 4, via which only analog signals are output. In the illustrated example, there are two wires that transfer an electric voltage. The sensor unit 2 is connected to an electronic insert 5 that is assigned to it or, respectively, assigned to the measuring principle of the respective sensor unit 2. Thus, different sensor units 2 can be connected to an electronic insert 5, insofar as the sensor units 2 are used for determining the same measured variables with the same measuring principle. For the reception of the analog primary signal, the electronic insert 5 has an analog input interface 6.

The electronic insert 5 is tailored to the sensor unit 2 in the respect that it contains components that allow for the determination of the value of the measured variable from the primary signal. Preferably, suitable evaluation algorithms are also stored.

If it is necessary, depending on the measuring method, that the sensor unit 2 is calibrated or special material data of the sensor unit 2 is required for determining the measured variable, then this data is stored on a data carrier 7, which the sensor unit 2 provides.

In one variation, only one identification of the sensor unit 2 is stored, from which, if necessary, the necessary information for the determination of the measured variable can be provided by means of accessing externally stored data.

In this case, the data carrier 7 is mounted in the housing 8 that forms the sensor unit 2.

In order to implement the measurements of different measured variables using a transmitter 3, two electronic receptacles 9 are provided here. The electronic insert 5 is located in one of them. The other is shown as being free of the second electronic insert 5' of the second sensor unit 2' indicated here as fill level meter, but would be inserted for use.

Based on the data of the data carrier 7, the sensor unit 2 can be automatically identified, since the transmitter 3 has a data reader 10. If the data carrier 7 is a bar code, then the data reader 10 is a bar code scanner. If the data carrier 7 is a NFC tag, as is the case here, then the data reader 10 accordingly reads the data.

A radio interface 11 is provided in order to be able to access the data for sensor units that have no or little data on their data carrier 7, via which access to an external database 12 is available for the transmitter 3.

The sensor unit 2 connected to the transmitter 3 here—or, more exactly, via the electronic insert 5 inserted in the electronics receptacle—is used for measuring pH. A measuring electrode 13 and a reference electrode 14 are provided for this. The measuring electrode 13 is located in a glass body that closes with a glass membrane. The housing 3 of the sensor unit 2 is limited on one side by a diaphragm 16. Additionally, a temperature sensor is also provided. An electric contact can also be attached to this temperature sensor, so that the temperature signal can also be used for determining the pH value. This is not shown here for reasons of clarity.

Both electrodes 13, 14 are each directly attached via a wire 17 to the analog input interface 6 of the electronic insert 5. The analog input interface 4 is, hereby, simply two electric terminal contacts. Alternatively, the sensor unit 2 and the electronic insert 5 are connected to one another via a—not shown—multi-pole cable.

The electronic insert 5 determines a measure for the pH value from the arising electric potentials, in each case, by using calibration data.

Preferably, a uniform format is used for the output signal of the electronic insert 5, 5', so that the transmitter 3 is always able to deal with these signals in the same manner.

For further data processing, the transmitter 3 has its own data storage 18, on which additional data for different sensor units 2 or for electronic inserts 5 can be stored.

The second electronic insert 5' has a storage unit 19, in which the data can be stored using a plurality of different sensor units 2 or second sensor units 2'.

If the measurement data is suitably processed or treated, then it is communicated by the transmitter 3 via its field bus interface 20 and a field bus 21 to a—not shown here—control room.

Control of the transmitter 3 or, respectively thereby, of the measurements by means of the sensor units 2, 2' is carried out by a user 22 utilizing a tablet 23.

What is claimed is:

1. A device for determining at least one measured variable, comprising:
at least one electronic insert,
at least one sensor unit and
at least one transmitter,
further comprising an analog output interface,
wherein the at least one sensor unit generates at least one electric primary signal in dependence on a measured variable and is configured to communicate the at least one electric primary signal via the analog output interface to the at least one transmitter, wherein the at least one transmitter is adapted for processing the at least one electric primary signal, and wherein the at least one electronic insert is assigned to the sensor unit, the at least one electronic insert being provided with the at least one analog input interface for reception of the at least one electric primary signal from the at least one sensor unit, wherein the at least one electronic insert is adapted for processing at least the at least one electric primary signal based on the measured variable and wherein the at least one electronic insert and the at least one transmitter are detachably connected to one another, wherein the at least one electronic insert is mounted in the transmitter in a detachable manner so as to form an exchangeable part of the transmitter.

2. The device according to claim 1, wherein the at least one sensor unit and the at least one transmitter are provided with connectors which enable detachable connection thereof to one another.

3. The device according to claim 1, wherein the at least one sensor unit comprises a pH sensor.

4. The device according to claim 2, wherein the at least one sensor unit comprises a pH sensor.

5. The device according to claim 4, wherein the at least one sensor unit has a calibration mode for offline calibration under settable conditions.

6. The device according to claim 2, wherein the at least one sensor unit has at least one data carrier, wherein data pertaining to the at least one sensor unit is storable in the at least one data carrier and wherein the at least one data carrier is arranged on and/or in a housing of the at least one sensor unit.

7. The device according to claim 6 wherein the at least one data carrier is an RFID or NFC tag.

8. The device according to claim 2, wherein the analog output interface is the sole output interface and wherein the at least one sensor unit is free of elements that generate a digital signal from the at least one primary electric signal and/or a determine a value of the measured variable from the at least one primary electric signal.

9. The device according to claim 8, wherein the at least one sensor unit is free of electronic components.

10. The device according to claim 1, further comprising:
at least one electronics receptacle for the at least one electronic insert adapted for detachably receiving the at least one sensor unit and for processing the at least one primary electric signal thereof.

11. The device according to claim 10, wherein the at least one sensor unit has at least one data carrier and further comprising at least one data reader for reading data from the at least one data carrier of the at least one sensor unit.

12. The device according to claim 11, wherein the data reader is adapted for writing data on the data carrier of the at least one sensor unit.

13. The device according to 10, further comprising at least one radio interface.

14. The device according to claim 10, further comprising at least one input/output interface.

* * * * *